Nov. 6, 1962  S. W. BRIGGS  3,062,378

FILTER ELEMENT AND METHOD

Filed March 30, 1959

INVENTOR
SOUTHWICK W. BRIGGS

BY Raymond W Leoften

ATTORNEY

United States Patent Office 3,062,378
Patented Nov. 6, 1962

3,062,378
FILTER ELEMENT AND METHOD
Southwick W. Briggs, Chevy Chase, Md. (% Stone Straw Corporation, 900 Franklin St. NE., Washington, D.C.)
Filed Mar. 30, 1959, Ser. No. 802,918
9 Claims. (Cl. 210—493)

This invention relates to filter elements and methods of making the same.

In accordance with the present invention a full flow paper is produced from a shunt paper resulting in an extended useful life and an increased flow rate.

The problem giving rise to the present invention involves the filtration of lubricating oils for railroad diesel engines. In order to remove benzine insoluble solids, such as combustion products, it has been customary to employ seven second paper. However, as is well known in the art, twice as much seven second paper is required to permit a given flow as is the case with three and one-half second paper. The problem involves the prevention of the passage of any abrasive particles larger than 20 microns as well as preventing the passage of the benzine insoluble solids without necessitating frequent changes of the filter material.

The solution to this problem constitutes a marked manufacturing advantage over known techniques and products, permitting the results to be achieved very simply and inexpensively.

A filter element conforming to the present invention comprises a body formed from fibrous sheet paper stock containing substantially uniform corrugations having heterogeneously disposed thin portions of relatively high permeability. The thin portions are disposed predominantly along the peaks of the corrugations and are substantially parallel thereto. The corrugations will ordinarily have a depth at least as great as the thickness of the stock which according to a very successful embodiment is composed of cotton linters and alpha cellulose in substantially equal parts, impregnated with about 20% resin. According to one successful application, the stock has a thickness of 0.020 inch and a corrugation depth of from about 0.020 inch to about 0.022 inch.

The method of making filter elements from fibrous sheet paper stock according to the present invention comprises embossing the stock to a depth at which heterogeneous thinning and increased permeability of the stock occurs. The depth of embossing is preferably at least equal to the stock thickness and is preferably effected by corrugating the stock substantially uniformly.

A more complete understanding of the invention will follow a description of the accompanying drawings wherein.

Figure 1:
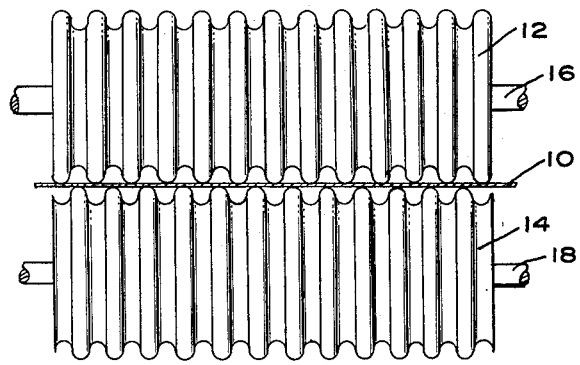
FIG. 1 is a somewhat diagrammatic elevation, partially in section depicting corrugating rolls of a type suitable for producing the article of the present invention.

A sheet or web of stock 10 to be used as a filter element is shown in FIG. 1 as interposed between corrugating rolls 12 and 14 carried by shafts 16 and 18 respectively, which can be moved closer together to produce corrugations in the stock of desired depth.

Figure 2:
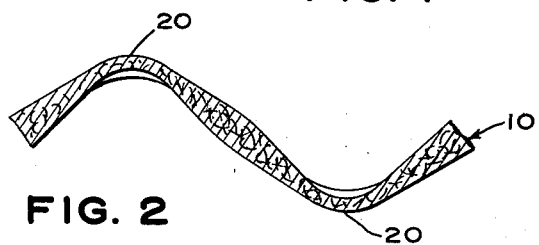
FIG. 2 is a fragmentary section of the corrugated stock on a somewhat enlarged scale.
Figure 3:
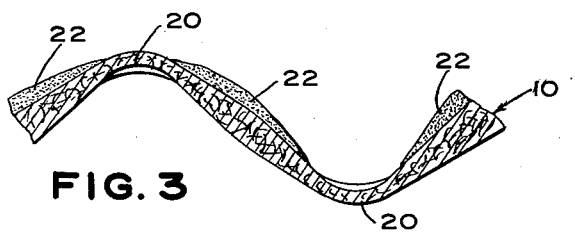
FIG. 3 is a fragmentary section of the stock of FIG. 2 depicting the manner in which cake builds up in its use.

Prior to the present invention, it has been customary to corrugate stock in a similar manner but to a smaller depth than contemplated herein. For example, starting with a sheet of stock containing 50% cotton linters and 50% alpha cellulose, and containing 20% resin, a sheet of 0.02 inch thickness has been corrugated to depths of from 0.013 inch to 0.015 inch to produce a corrugated body having a weight of approximately 77 lbs. for each 3000 square feet. In accordance with the present invention, stock of this same type is corrugated to depths of from 0.020 inch to 0.022 inch resulting in a reduction of weight to approximately 71 lbs. for each 3000 square feet of stock. In other words, the depths of the corrugations according to the present invention will be of the order of the thickness of the stock or greater. As result of this increased depth of corrugation, definite thinning of the stock occurs in a somewhat heterogeneous manner as indicated in FIG. 2, the thinning usually occurring parallel to and along the nodes 20 of the stock. The thinning has been referred to as somewhat heterogeneous, since it is neither continuous nor does it assume any regular repetitive pattern. The portions of the stock lying between the thinned portions tend to accumulate the filter cake 22 as shown in FIG. 3.

Figure 4:
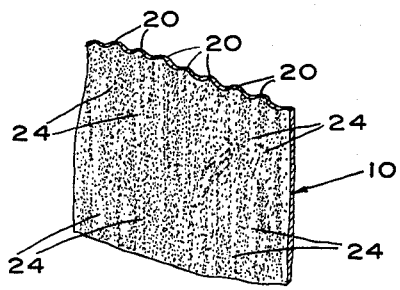
FIG. 4 is a fragmentary perspective view of corrugated stock produced in accordance with the present invention.

The heterogeneous arrangement of the thinned portions will be evident from the showing of FIG. 4 wherein the thinned portions 24 occur in a very indefinite and non-repetitive pattern.

This heterogeneous thinning may be caused by the non-homogeneous nature of the paper stock itself, but the reason is of minor importance so long as the results are so advantageous and reproducible as has been found in accordance with this invention.

In the particular example described with reference to the foregoing numerical values, the thinned portions of the stock exclude abrasives having a size of 20 microns or larger but pass anything smaller including benzine insoluble particles. When employed in a filter assembly exposed to the passage of 60 gallons per minute of SAE 40 lubricant oil at 180° F., 6000 square inches of the stock have exhibited a useful life of thirty days or more.

Figure 6:
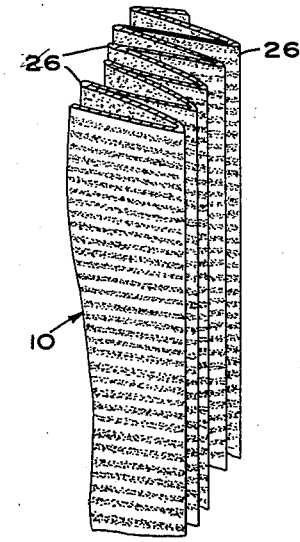
FIG. 6 is a fragmentary perspective on an enlarged scale depicting the use of the stock in accordance with the present invention as a pleated filter element.

In FIG. 6, the stock 10 has been depicted as pleated with the folds 26 of the pleats extending perpendicularly to the direction of the corrugations.

Figure 5:
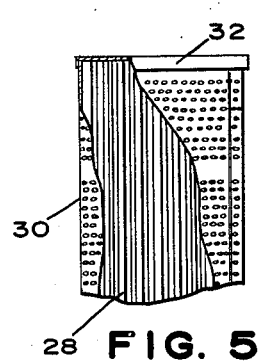
FIG. 5 is a fragmentary elevation, partially broken away showing the manner in which the stock is used in one type of filter assembly.

In FIG. 5, a pleated filter element 28 embodying the present invention has been shown as combined with a perforated cover 30 and a cap 32 conforming to the arrangement of application Serial No. 700,456, filed on December 3, 1957, now Patent No. 2,919,807.

Whereas only one specific form of the invention has been described for purposes of illustration, many variations are contemplated as falling within the scope of the appended claims.

I claim:

1. A filter element comprising a body formed from fibrous sheet paper stock containing on opposed surfaces thereof substantially uniform corrugations having heterogeneously disposed imperforate thin stretched portions of high permeability and substantially increased porosity relative to portions of said element intermediate said thin portions, said thin portions lying predominently along the peaks and valleys of said corrugations.

2. A filter element as set forth in claim 1 wherein said thin portions are disposed substantially parallel to the peaks and valleys of said corrugations.

3. A filter element as set forth in claim 1 wherein said corrugations have a depth approximating the thickness of said stock.

4. A filter element as set forth in claim 1 wherein said corrugations have a depth exceeding the thickness of said stock.

5. A filter element as set forth in claim 1 wherein said stock comprises cotton linters and alpha cellulose.

6. A filter element as set forth in claim 1 wherein said stock comprises substantially equal parts of cotton linters and alpha cellulose.

7. A filter element as set forth in claim 1 wherein said stock comprises substantially equal parts of cotton linters and alpha cellulose, is impregnated with about 20% resin, has a thickness of the order of 0.020 inch and a corrugation depth of from about 0.020 inch to about 0.022 inch.

8. A method of making filter elements from fibrous sheet paper stock comprising embossing and stretching said stock between opposed corrugating members to produce corrugations having a depth of the order of the original thickness of said stock whereby sufficient heterogeneous thinning of said stock is produced to substantially increase the permeability and porosity thereof.

9. A method according to claim 8 wherein said stock is substantially uniformly corrugated between rolls.

References Cited in the file of this patent

UNITED STATES PATENTS

| | | |
|---|---|---|
| 2,321,985 | Briggs | June 15, 1943 |
| 2,395,449 | Briggs | Feb. 26, 1946 |
| 2,675,127 | Layte | Apr. 13, 1954 |
| 2,801,009 | Bowers | July 30, 1957 |

FOREIGN PATENTS

| | | |
|---|---|---|
| 725,066 | Great Britain | Mar. 2, 1955 |

UNITED STATES PATENT OFFICE
CERTIFICATE OF CORRECTION

Patent No. 3,062,378  November 6, 1962

Southwick W. Briggs

It is hereby certified that error appears in the above numbered patent requiring correction and that the said Letters Patent should read as corrected below.

Column 2, line 22, for "nodes" read -- peaks and valleys

Signed and sealed this 30th day of July 1963.

(SEAL)
Attest:

ERNEST W. SWIDER
Attesting Officer

DAVID L. LADD
Commissioner of Patents